US009146411B2

(12) United States Patent
Chen et al.

(10) Patent No.: US 9,146,411 B2
(45) Date of Patent: Sep. 29, 2015

(54) LIQUID CRYSTAL DISPLAY WITH DISPLAY SCREEN EXTENDING OUT OF CASING

(71) Applicant: INNOLUX CORPORATION, Miao-Li County (TW)

(72) Inventors: Chih-Hao Chen, Miao-Li County (TW); Chih-Wei Ho, Miao-Li County (TW); Chao-Yi Hung, Miao-Li County (TW); Tsau-Hua Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 34 days.

(21) Appl. No.: 14/219,520

(22) Filed: Mar. 19, 2014

(65) Prior Publication Data

US 2015/0185535 A1     Jul. 2, 2015

Related U.S. Application Data

(63) Continuation of application No. 14/142,002, filed on Dec. 27, 2013.

(51) Int. Cl.
*G02F 1/1333* (2006.01)
*G02F 1/1339* (2006.01)

(52) U.S. Cl.
CPC ........ *G02F 1/133308* (2013.01); *G02F 1/1339* (2013.01); *G02F 2202/16* (2013.01); *G02F 2202/28* (2013.01)

(58) Field of Classification Search
CPC .................... G02F 1/133308; G02F 1/133608
See application file for complete search history.

(56) References Cited

U.S. PATENT DOCUMENTS 5,973,763 A * 10/1999 Fujimura et al. .............. 349/156

* cited by examiner

*Primary Examiner* — Phu Vu
(74) *Attorney, Agent, or Firm* — Li&Cai Intellectual Property (USA) Office

(57) ABSTRACT

An exemplary liquid crystal display (LCD) includes a casing and a liquid crystal panel accommodated in the casing. The casing includes a frame and a window surrounded by an inner side of the frame. The liquid crystal panel includes an outside surface essentially serving as a display screen for displaying images and a peripheral wall. The liquid crystal panel is attached to the frame, with the inner side of the frame contacting the peripheral wall of the liquid crystal panel, and the display screen exposed outside of the casing.

14 Claims, 5 Drawing Sheets

LIQUID CRYSTAL DISPLAY WITH DISPLAY SCREEN EXTENDING OUT OF CASING

CROSS REFERENCE TO RELATED APPLICATION

This application is a continuation of U.S. application Ser. No. 14/142,002 filed on 27 Dec. 2013 and entitled "LIQUID CRYSTAL DISPLAY WITH DISPLAY SCREEN EXTENDING OUT OF CASING", now pending.

BACKGROUND OF THE DISCLOSURE

1. Field of the Disclosure

The present disclosure relates to liquid crystal displays (LCDs), and more particularly to a liquid crystal display having a display screen extending out of a casing.

2. Description of Related Art

An LCD has advantages of portability, low power consumption, and low radiation, and has been widely used in various portable information products such as notebooks, personal digital assistants (PDAs), video cameras and the like. A typical LCD includes a casing and a liquid crystal panel accommodated in the casing. The liquid crystal panel includes a thin film transistor (TFT) substrate, a color filter (CF) substrate opposite to the TFT substrate, a liquid crystal layer sandwiched between the two substrates, and a sealant surrounding the liquid crystal layer. The sealant is coated on a peripheral region of the TFT substrate, and is sandwiched between the two substrates. The two substrates and the sealant cooperatively define a space for accommodating the liquid crystal layer. Silver beads are provided at an outside of the sealant, and electrically connect the two substrates.

The LCD may be used in an environment where temperatures alternate between hot and cold. Under such conditions, shadows may appear at a periphery of a display area of the liquid crystal panel. This problem is commonly known as the black-sun phenomenon. In addition, slight corrosion may also appear at the positions where the silver beads are located. Thus the display quality of the LCD is impaired.

What is needed, therefore, is an LCD which can overcome the described limitations.

SUMMARY OF THE INVENTION

An exemplary liquid crystal display (LCD) includes a casing and a liquid crystal panel accommodated in the casing. The casing includes a frame and a window surrounded by an inner side of the frame. The liquid crystal panel includes an outside surface essentially serving as a display screen for displaying images and a peripheral wall. The liquid crystal panel is attached to the frame, with the inner side of the frame contacting the peripheral wall of the liquid crystal panel, and the display screen exposed outside of the casing.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DESCRIPTION OF EMBODIMENTS

Reference will be made to the drawings to describe preferred and exemplary embodiments in detail.

In order to understand the reasons for the black-sun phenomenon of LCDs, repeated testing and verification have demonstrated the following matters, among others. The liquid crystal panel includes a major outside surface, which essentially serves as a display screen for displaying images. The casing for accommodating the liquid crystal panel includes a frame which has a central window. The display screen of the liquid crystal panel is viewable through the window. The frame includes a top surface, and the elevation of the top surface is higher than the display screen. When the LCD is used in an environment where temperatures alternate between hot and cold, dew appears on the display screen and gathers around the periphery of the display screen adjacent to the frame. This results in vapor of the dew being able to access the interior of the liquid crystal panel and form a high-humidity environment in the liquid crystal panel.

In addition, a TFT substrate and a CF substrate of a typical liquid crystal panel are electrically connected to each other via silver beads. The silver beads pass through holes in an insulating layer of the TFT substrate to electrically connect with metal circuits which are located under the insulating layer. When the interior of the liquid crystal panel has the high-humidity environment, the holes in the insulating layer expose the metal circuits to the vapor. In particular, portions of the metal circuits adjacent to the silver beads become high-risk locations subject to corrosion. When this happens, the adhesion of the sealant may be impaired. Thus, shadows may appear on the periphery of the display screen, and the display quality of the liquid crystal display device is reduced.

In this description, a reference to "dew" can include a reference to moisture in general.

Figure 1:
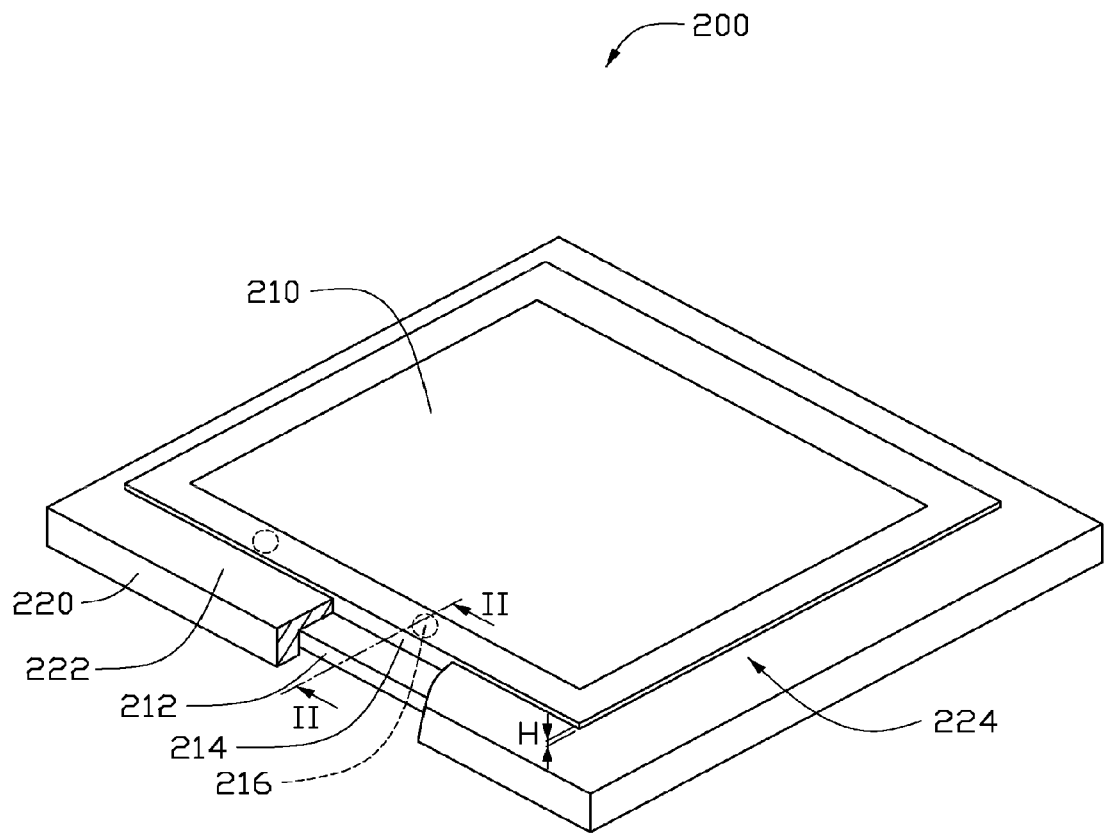
FIG. 1 is an isometric view of a liquid crystal display device according to a first embodiment of the present disclosure, showing part of the liquid crystal display device cut away.
Figure 2:
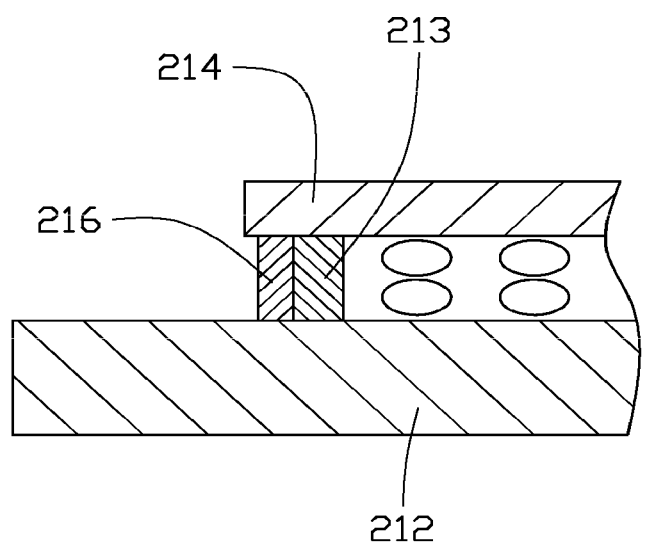
FIG. 2 is a cross-sectional view taken along line II-II of FIG. 1.

Referring to FIG. 1 and FIG. 2, schematic views of a liquid crystal display device according to a first embodiment of the present disclosure are shown. The liquid crystal display device 200 includes a casing 220, and a liquid crystal panel 210 accommodated in the casing 220. The casing 220 may be made of plastic material.

The liquid crystal panel 210 includes a first substrate 212, a second substrate 214 opposite to the first substrate 212, and a liquid crystal layer (not labeled) sandwiched between the two substrates 212, 214. The first substrate 212 may be a TFT substrate, and the second substrate 214 may be a CF substrate. A sealant 213 is coated on a peripheral region of the first substrate 212, and is sandwiched between the two substrates 212, 214. The sealant 213 surrounds the liquid crystal layer. The two substrates 212, 214 and the sealant 213 cooperatively define a space accommodating the liquid crystal layer. A plurality of conductive adhesives 216 (only two shown) is provided at an outside of the sealant 213, and electrically connect the two substrates 212, 214. Each conductive adhesive 216 is generally in the form of a discrete bead. In the illustrated embodiment, each conductive adhesive 216 is approximately cylindrical. The beads include at least one silver-based compound, which includes silver grains. The liquid crystal panel 210 has a major outside surface, which essentially serves as a display screen (not labeled) that shows images viewed by users. In particular, the outside surface of the second substrate 214 essentially serves as the display screen.

The casing 220 includes a frame 222, and a window (not labeled) surrounded by the frame 222. The liquid crystal panel 210 is attached to the frame 222, with the display screen extending through the window, and an inner side of the frame 222 contacting the peripheral area of the liquid crystal panel 210. That is, the display screen passes through the window and protrudes out from the window. The frame 222 includes a top surface 224, and an elevation of the top surface 224 is lower than an elevation of a top of the display screen. Thus, there is a distance H defined between the top surface 224 of the frame 222 and the display screen. That is, the display screen of the liquid crystal panel 210 extends out of the casing 220 from the window.

In use, when the liquid crystal display device 200 is in an environment where temperatures alternate between hot and cold, dew occurring on the display screen may include dew on the peripheral area of the display screen. Because the elevation of the top surface of the frame 222 is lower than that of the top of the display screen, at least some of the dew on the peripheral area of the display screen can drain down to the top surface of the frame 222. Therefore the dew is spread over a larger area, and can more easily evaporate off.

In the above-described conventional art, dew is liable to gather around a periphery of the display screen where the periphery of the display screen adjoins a frame. That is, dew is liable to gather at a vapor-permeable interface between the display screen and the frame. In contrast, in the present embodiment, the amount of dew present at (a top of) an interface between the frame 222 and the liquid crystal panel 210 is relatively little. As a result, the risk of vapor of the dew penetrating the interface between the frame 222 and the liquid crystal panel 210 is relatively low. A high-humidity environment is apt to not be formed in the liquid crystal panel 210, and corrosion within the liquid crystal panel 210 is avoided. Thus, the LCD 200 can work normally and reliably.

Figure 3:
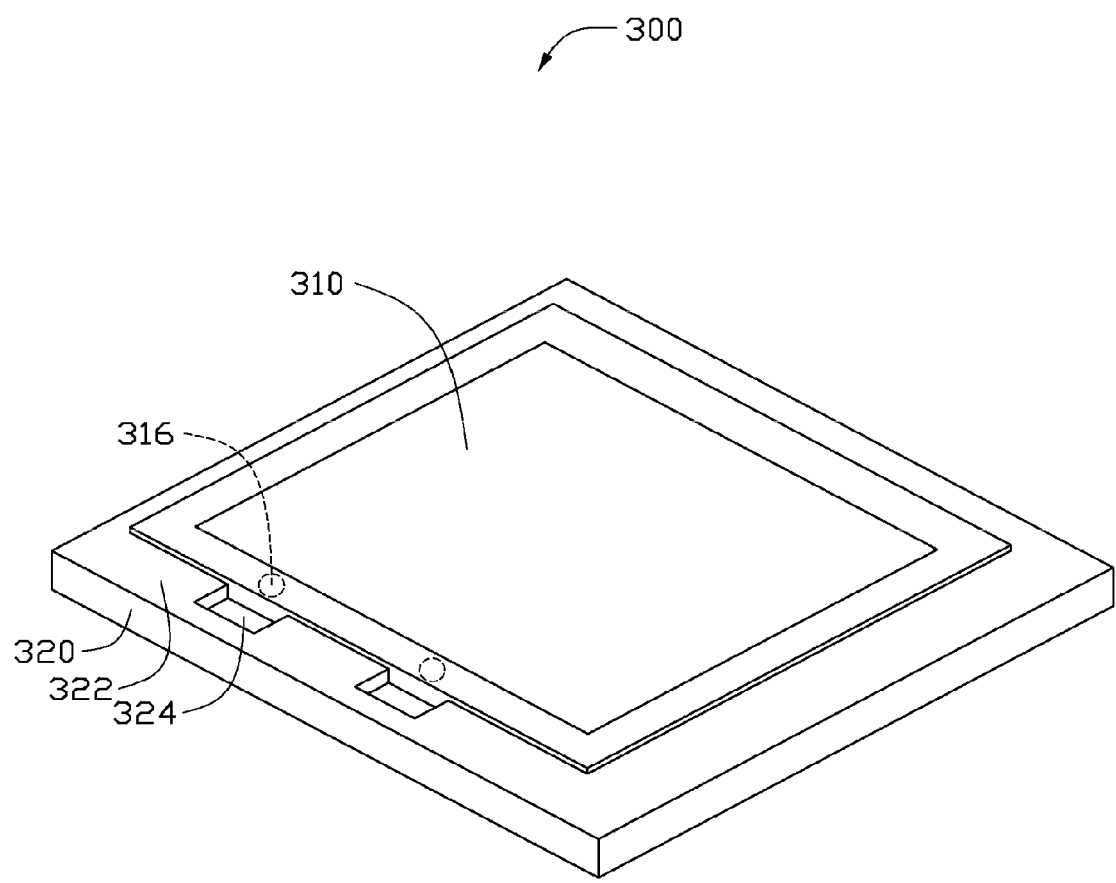
FIG. 3 is an isometric view of a liquid crystal display device according to a second embodiment of the present disclosure.

Referring to FIG. 3, an LCD 300 according to a second embodiment of the present disclosure is similar to the LCD 200 of the first embodiment. However, in the LCD 300, at least one groove 324 is provided in a frame 322 of a casing 320. In the illustrated embodiment, there are a plurality of the grooves 324. Each groove 324 may have a rectangular shape. Each groove 324 is positioned corresponding to a respective one of a plurality of conductive adhesives 316 (only two shown) of a liquid crystal panel 310. Thus portions of the liquid crystal panel 310 having metal circuits adjacent to the conductive adhesives 316 are also located corresponding to the grooves 324. Each groove 324 can act as a kind of dew sink, and dew collected in the groove 324 is spread over a relatively large area at a bottom of the groove 324. Therefore the dew can more easily evaporate off. As a result, the risk of the dew penetrating an interface between the frame 322 and the liquid crystal panel 310 is relatively low. A high-humidity environment is apt to not be formed in the liquid crystal panel 310, and corrosion within the liquid crystal panel 210 is avoided. Thus, the LCD 300 can work normally and reliably.

Moreover, the advantageous grooves 324 are positioned where the risk of corrosion would otherwise be highest—at the conductive adhesives 316.

Figure 4:
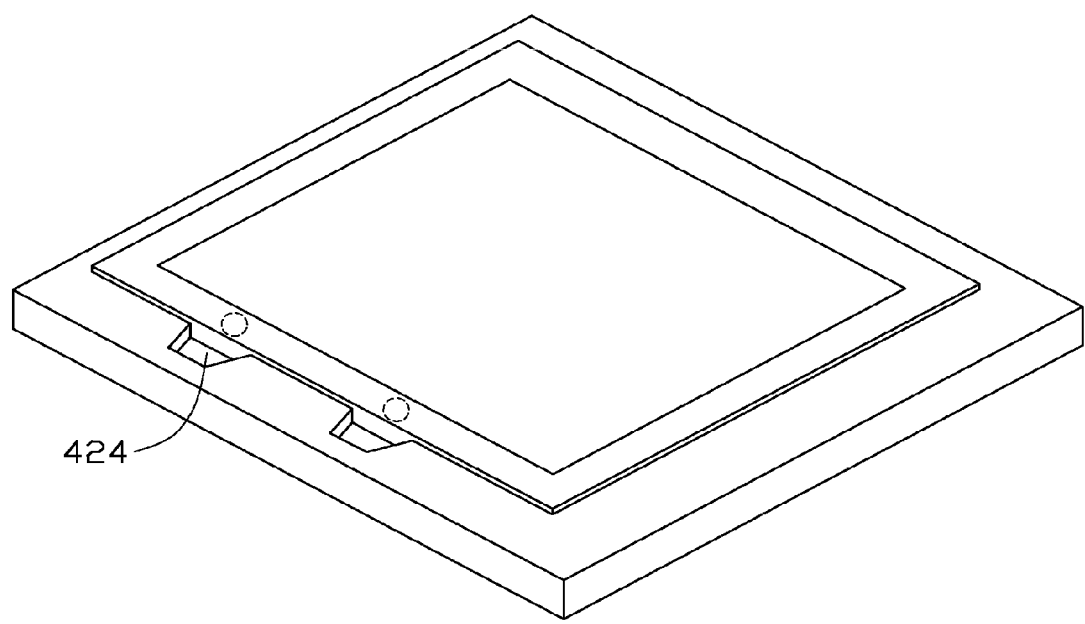
FIG. 4 is an isometric view of a liquid crystal display device according to a third embodiment of the present disclosure.

Referring to FIG. 4, an LCD according to a third embodiment of the present disclosure is similar to the LCD 300 of the second embodiment. However, each of grooves 424 has a trapezoidal shape.

Figure 5:
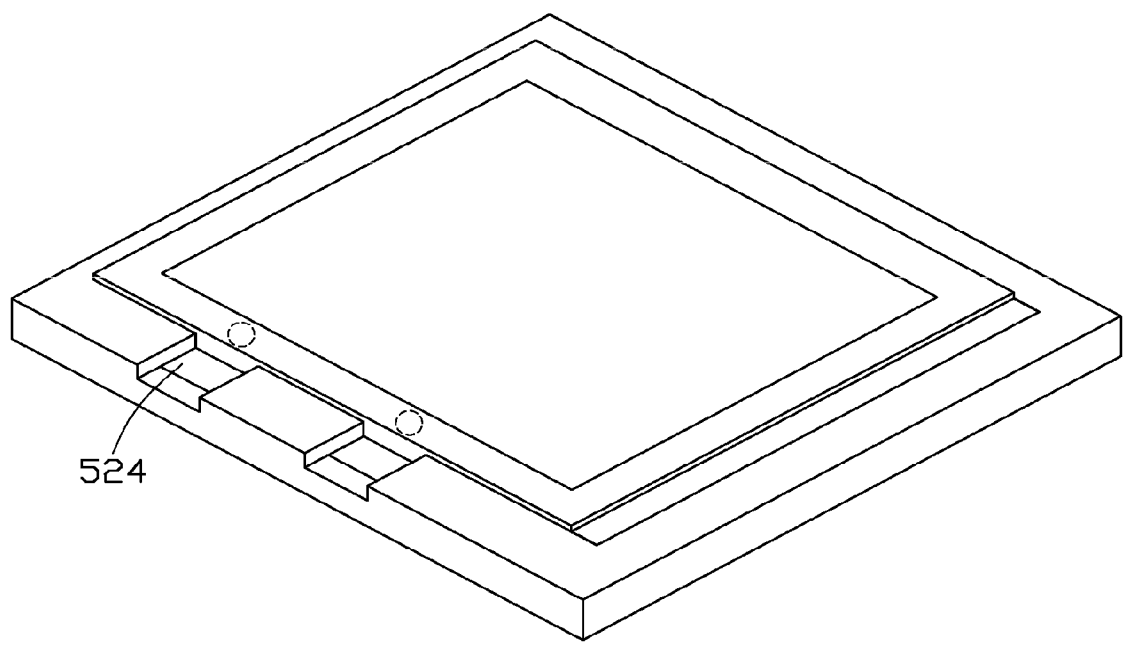
FIG. 5 is an isometric view of a liquid crystal display device according to a fourth embodiment of the present disclosure.

Referring to FIG. 5, an LCD according to a fourth embodiment of the present disclosure is similar to the LCD 200 of the second embodiment. However, each of grooves 524 runs through an entire transverse width of a frame.

The LCD herein is not limited to the above-described embodiments. For example, the frame may include a plurality of grooves, wherein some of the grooves have a rectangular shape, and other of the grooves have a trapezoidal shape. The quantity and the shapes of the grooves can be configured according to particular requirements.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display (LCD), comprising:
   a liquid crystal panel having a display surface and a peripheral wall, and comprising a first substrate and a second substrate opposite to the first substrate;
   a conductive adhesive electrically connecting the first substrate and the second substrate; and
   a frame capable of mounting the liquid crystal panel and having a side wall; and
   a plurality of grooves formed on the frame and corresponding to the conductive adhesive,
   wherein the peripheral wall of the liquid crystal is adjacent to and partially abuts the side wall of the frame.

2. The LCD as claimed in claim 1, wherein the first substrate is a TFT substrate and the second substrate is a CF substrate.

3. The LCD as claimed in claim 1, wherein at least one of the grooves goes through the frame.

4. The LCD as claimed in claim 1, wherein at least one of the grooves goes through along a direction substantially perpendicular to the display surface.

5. The LCD as claimed in claim 1, wherein at least one of the grooves goes through an entire transverse width of the frame.

6. The LCD as claimed in claim 1, wherein the grooves partially exposes the peripheral wall of the liquid crystal panel.

7. The LCD as claimed in claim 6, wherein the grooves are formed on a top surface of the frame, and the top surface faces to a direction substantially the same as the display surface and is arranged at a higher elevation than the display surface.

8. The LCD as claimed in claim 1, wherein the display surface is arranged at a higher elevation than the side wall of the frame abutting the peripheral wall of the liquid crystal panel.

9. The LCD as claimed in claim 1, wherein a sealant is coated on a peripheral region of the first substrate, and is sandwiched between the first and second substrates, the two substrates and the sealant cooperatively define a space for accommodating a liquid crystal layer.

10. The LCD as claimed in claim 9, wherein the conductive adhesive is provided at an outside of the sealant.

11. The LCD as claimed in claim 1, wherein the conductive adhesive is provided in a form of discrete beads, and each of the discrete beads is corresponding to at least one of the grooves.

12. The LCD as claimed in claim 1, wherein at least one of the grooves defines a trapezium profile.

13. The LCD as claimed in claim 1, wherein at least one of the grooves defines a rectangular profile.

14. The LCD as claimed in claim 1, wherein the display surface of the liquid crystal panel is arranged at a higher elevation than a lowest point of the grooves formed on the frame abutting the peripheral wall of the liquid crystal panel.

\* \* \* \* \*